US009979665B2

(12) United States Patent
Han et al.

(10) Patent No.: US 9,979,665 B2
(45) Date of Patent: *May 22, 2018

(54) REDUCING BUFFER USAGE FOR TCP PROXY SESSION BASED ON DELAYED ACKNOWLEDGEMENT

(71) Applicant: A10 Networks, Inc., San Jose, CA (US)

(72) Inventors: Liang Han, Pleasanton, CA (US); Zhiruo Cao, San Jose, CA (US)

(73) Assignee: A10 NETWORKS, INC., San Jose, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/374,935

(22) Filed: Dec. 9, 2016

(65) Prior Publication Data

US 2017/0126575 A1 May 4, 2017

Related U.S. Application Data

(63) Continuation of application No. 13/747,545, filed on Jan. 23, 2013, now Pat. No. 9,531,846.

(51) Int. Cl.
*G06F 15/16* (2006.01)
*H04L 12/841* (2013.01)
(Continued)

(52) U.S. Cl.
CPC ........ *H04L 47/283* (2013.01); *H04L 43/0864* (2013.01); *H04L 43/16* (2013.01); *H04L 67/42* (2013.01); *H04L 69/16* (2013.01)

(58) Field of Classification Search
CPC ....... H04L 67/28; H04L 47/283; H04L 69/16; H04W 80/06
See application file for complete search history.

(56) References Cited

U.S. PATENT DOCUMENTS 5,774,660 A  6/1998  Brendel et al.
5,862,339 A  1/1999  Bonnaure et al.
(Continued)

FOREIGN PATENT DOCUMENTS

CN  1372662 A  10/2002
CN  1473300 A  2/2004
(Continued)

OTHER PUBLICATIONS

Cardellini et al., "Dynamic Load Balancing on Web-server Systems", IEEE Internet Computing, vol. 3, No. 3, May-Jun. 1999, 24 pages.
(Continued)

*Primary Examiner* — Aftab N. Khan
(74) *Attorney, Agent, or Firm* — AMPACC Law Group, LLP; Keith Kline

(57) ABSTRACT

Reducing buffer usage for a TCP proxy session between a client and a server by a service gateway includes: determining a first round trip time (RTT) for a server side TCP session and determining a second RTT for a client side TCP session; comparing the first RTT with the second RTT; determining whether the second RTT exceeds the first RTT beyond a threshold; if so, then calculating a desired RTT based on the second RTT; and setting a timer according to the calculated desired RTT, where a TCP acknowledgement for the server side TCP session is delayed until the timer expires. The desired RTT may be calculated as a percentage of the second RTT or as the second RTT minus a predetermined value. The service gateway waits until the timer has expired before sending a TCP acknowledgement data packet to the server.

17 Claims, 3 Drawing Sheets

(51) Int. Cl.
*H04L 29/06* (2006.01)
*H04L 12/26* (2006.01)

(56) References Cited

U.S. PATENT DOCUMENTS

| | | | |
|---|---|---|---|
| 5,875,185 A | 2/1999 | Wang et al. | |
| 5,958,053 A | 9/1999 | Denker | |
| 6,003,069 A | 12/1999 | Cavill | |
| 6,047,268 A | 4/2000 | Bartoli et al. | |
| 6,075,783 A | 6/2000 | Voit | |
| 6,131,163 A | 10/2000 | Wiegel | |
| 6,321,338 B1 | 11/2001 | Porras et al. | |
| 6,374,300 B2 | 4/2002 | Masters | |
| 6,456,617 B1 | 9/2002 | Oda et al. | |
| 6,483,600 B1 | 11/2002 | Schuster et al. | |
| 6,535,516 B1 | 3/2003 | Leu et al. | |
| 6,578,066 B1 | 6/2003 | Logan et al. | |
| 6,587,866 B1 | 7/2003 | Modi et al. | |
| 6,600,738 B1 | 7/2003 | Alperovich et al. | |
| 6,658,114 B1 | 12/2003 | Farn et al. | |
| 6,772,205 B1 | 8/2004 | Lavian et al. | |
| 6,772,334 B1 | 8/2004 | Glawitsch | |
| 6,779,033 B1 | 8/2004 | Watson et al. | |
| 6,804,224 B1 | 10/2004 | Schuster et al. | |
| 7,010,605 B1 | 3/2006 | Dharmarajan | |
| 7,058,718 B2 | 6/2006 | Fontes et al. | |
| 7,069,438 B2 | 6/2006 | Balabine et al. | |
| 7,143,087 B2 | 11/2006 | Fairweather | |
| 7,167,927 B2 | 1/2007 | Philbrick et al. | |
| 7,181,524 B1 | 2/2007 | Lele | |
| 7,228,359 B1 | 6/2007 | Monteiro | |
| 7,254,133 B2 | 8/2007 | Govindarajan et al. | |
| 7,269,850 B2 | 9/2007 | Govindarajan et al. | |
| 7,301,899 B2 | 11/2007 | Goldstone | |
| 7,310,686 B2 | 12/2007 | Uysal | |
| 7,328,267 B1 | 2/2008 | Bashyam et al. | |
| 7,337,241 B2 | 2/2008 | Boucher et al. | |
| 7,343,399 B2 | 3/2008 | Hayball et al. | |
| 7,370,353 B2 | 5/2008 | Yang | |
| 7,373,500 B2 | 5/2008 | Ramelson et al. | |
| 7,391,725 B2 | 6/2008 | Huitema et al. | |
| 7,398,317 B2 | 7/2008 | Chen et al. | |
| 7,423,977 B1 * | 9/2008 | Joshi | H04J 3/0682 370/231 |
| 7,430,755 B1 | 9/2008 | Hughes et al. | |
| 7,467,202 B2 | 12/2008 | Savchuk | |
| 7,506,360 B1 | 3/2009 | Wilkinson et al. | |
| 7,512,980 B2 | 3/2009 | Copeland et al. | |
| 7,552,323 B2 | 6/2009 | Shay | |
| 7,584,262 B1 | 9/2009 | Wang et al. | |
| 7,590,736 B2 | 9/2009 | Hydrie et al. | |
| 7,610,622 B2 | 10/2009 | Touitou et al. | |
| 7,613,193 B2 | 11/2009 | Swami et al. | |
| 7,613,822 B2 | 11/2009 | Joy et al. | |
| 7,673,072 B2 | 3/2010 | Boucher et al. | |
| 7,675,854 B2 | 3/2010 | Chen et al. | |
| 7,711,790 B1 | 5/2010 | Barrett et al. | |
| 7,733,866 B2 | 6/2010 | Mishra et al. | |
| 7,747,748 B2 | 6/2010 | Allen | |
| 7,826,487 B1 | 11/2010 | Mukerji et al. | |
| 7,965,727 B2 | 6/2011 | Sakata et al. | |
| 7,979,694 B2 | 7/2011 | Touitou et al. | |
| 7,990,847 B1 | 8/2011 | Leroy et al. | |
| 7,992,201 B2 | 8/2011 | Aldridge et al. | |
| 8,081,640 B2 | 12/2011 | Ozawa et al. | |
| 8,090,866 B1 | 1/2012 | Bashyam et al. | |
| 8,099,492 B2 | 1/2012 | Dahlin et al. | |
| 8,116,312 B2 | 2/2012 | Riddoch et al. | |
| 8,122,116 B2 | 2/2012 | Matsunaga et al. | |
| 8,151,019 B1 | 4/2012 | Le et al. | |
| 8,185,651 B2 | 5/2012 | Moran et al. | |
| 8,261,339 B2 | 9/2012 | Aldridge et al. | |
| 8,379,515 B1 | 2/2013 | Mukerji | |
| 8,559,437 B2 | 10/2013 | Mishra et al. | |
| 8,560,693 B1 | 10/2013 | Wang et al. | |
| RE44,701 E | 1/2014 | Chen et al. | |
| 8,681,610 B1 | 3/2014 | Mukerji | |
| 8,782,221 B2 | 7/2014 | Han | |
| 8,977,749 B1 | 3/2015 | Han | |
| 9,094,364 B2 | 7/2015 | Jalan et al. | |
| 9,106,561 B2 | 8/2015 | Jalan et al. | |
| 9,137,301 B1 | 9/2015 | Dunlap et al. | |
| 9,154,584 B1 | 10/2015 | Han | |
| 9,386,088 B2 | 7/2016 | Zheng et al. | |
| 9,531,846 B2 | 12/2016 | Han et al. | |
| 2001/0042200 A1 | 11/2001 | Lamberton et al. | |
| 2002/0026515 A1 | 2/2002 | Michielsens et al. | |
| 2002/0032799 A1 | 3/2002 | Wiedeman et al. | |
| 2002/0078164 A1 | 6/2002 | Reinschmidt | |
| 2002/0091844 A1 | 7/2002 | Craft et al. | |
| 2002/0103916 A1 | 8/2002 | Chen et al. | |
| 2002/0138618 A1 | 9/2002 | Szabo | |
| 2002/0141386 A1 | 10/2002 | Minert et al. | |
| 2002/0143991 A1 | 10/2002 | Chow et al. | |
| 2002/0188678 A1 | 12/2002 | Edecker et al. | |
| 2003/0009591 A1 | 1/2003 | Hayball et al. | |
| 2003/0035409 A1 | 2/2003 | Wang et al. | |
| 2003/0061506 A1 | 3/2003 | Cooper et al. | |
| 2003/0135625 A1 | 7/2003 | Fontes et al. | |
| 2004/0010545 A1 | 1/2004 | Pandya | |
| 2004/0062246 A1 | 4/2004 | Boucher et al. | |
| 2004/0073703 A1 | 4/2004 | Boucher et al. | |
| 2004/0078419 A1 | 4/2004 | Ferrari et al. | |
| 2004/0078480 A1 | 4/2004 | Boucher et al. | |
| 2004/0103315 A1 | 5/2004 | Cooper et al. | |
| 2004/0250059 A1 | 12/2004 | Ramelson et al. | |
| 2005/0005207 A1 | 1/2005 | Herneque | |
| 2005/0036511 A1 | 2/2005 | Baratakke et al. | |
| 2005/0039033 A1 | 2/2005 | Meyers et al. | |
| 2005/0080890 A1 | 4/2005 | Yang et al. | |
| 2005/0163073 A1 | 7/2005 | Heller et al. | |
| 2005/0198335 A1 | 9/2005 | Brown et al. | |
| 2005/0213586 A1 | 9/2005 | Cyganski et al. | |
| 2005/0240989 A1 | 10/2005 | Kim et al. | |
| 2005/0281190 A1 | 12/2005 | McGee et al. | |
| 2006/0023721 A1 | 2/2006 | Miyake et al. | |
| 2006/0036610 A1 | 2/2006 | Wang | |
| 2006/0041745 A1 | 2/2006 | Parnes | |
| 2006/0069804 A1 | 3/2006 | Miyake et al. | |
| 2006/0164978 A1 | 7/2006 | Werner et al. | |
| 2006/0168319 A1 | 7/2006 | Trossen | |
| 2006/0230129 A1 | 10/2006 | Swami et al. | |
| 2006/0280121 A1 | 12/2006 | Matoba | |
| 2007/0019543 A1 | 1/2007 | Wei et al. | |
| 2007/0022479 A1 | 1/2007 | Sikdar et al. | |
| 2007/0076653 A1 | 4/2007 | Park et al. | |
| 2007/0124502 A1 | 5/2007 | Li | |
| 2007/0180119 A1 | 8/2007 | Khivesara et al. | |
| 2007/0185998 A1 | 8/2007 | Touitou et al. | |
| 2007/0195792 A1 | 8/2007 | Chen et al. | |
| 2007/0230337 A1 | 10/2007 | Igarashi et al. | |
| 2007/0242738 A1 | 10/2007 | Park et al. | |
| 2007/0243879 A1 | 10/2007 | Park et al. | |
| 2007/0245090 A1 | 10/2007 | King et al. | |
| 2007/0248009 A1 | 10/2007 | Petersen | |
| 2008/0016161 A1 | 1/2008 | Tsirtsis et al. | |
| 2008/0031263 A1 | 2/2008 | Ervin et al. | |
| 2008/0076432 A1 | 3/2008 | Senarath et al. | |
| 2008/0120129 A1 | 5/2008 | Seubert et al. | |
| 2008/0225722 A1 | 9/2008 | Khemani et al. | |
| 2008/0253390 A1 | 10/2008 | Das et al. | |
| 2008/0291911 A1 * | 11/2008 | Lee | H04L 47/10 370/389 |
| 2008/0298303 A1 | 12/2008 | Tsirtsis | |
| 2009/0024722 A1 | 1/2009 | Sethuraman et al. | |
| 2009/0031415 A1 | 1/2009 | Aldridge et al. | |
| 2009/0077651 A1 | 3/2009 | Poeluev | |
| 2009/0092124 A1 | 4/2009 | Singhal et al. | |
| 2009/0138606 A1 | 5/2009 | Moran et al. | |
| 2009/0138945 A1 | 5/2009 | Savchuk | |
| 2009/0164614 A1 | 6/2009 | Christian et al. | |
| 2009/0285196 A1 | 11/2009 | Lee et al. | |
| 2010/0042869 A1 | 2/2010 | Szabo et al. | |
| 2010/0054139 A1 | 3/2010 | Chun et al. | |

(56) References Cited

U.S. PATENT DOCUMENTS

| | | | |
|---|---|---|---|
| 2010/0061319 A1 | 3/2010 | Aso et al. | |
| 2010/0064008 A1 | 3/2010 | Yan et al. | |
| 2010/0082787 A1* | 4/2010 | Kommula | H04L 67/1008 709/223 |
| 2010/0095018 A1 | 4/2010 | Khemani et al. | |
| 2010/0106854 A1 | 4/2010 | Kim et al. | |
| 2010/0205310 A1 | 8/2010 | Altshuler et al. | |
| 2010/0228819 A1 | 9/2010 | Wei | |
| 2010/0235522 A1 | 9/2010 | Chen et al. | |
| 2010/0238828 A1* | 9/2010 | Russell | H04L 43/0864 370/252 |
| 2010/0265824 A1 | 10/2010 | Chao et al. | |
| 2010/0268814 A1 | 10/2010 | Cross et al. | |
| 2010/0318631 A1 | 12/2010 | Shukla | |
| 2010/0322252 A1 | 12/2010 | Suganthi et al. | |
| 2010/0333101 A1 | 12/2010 | Pope et al. | |
| 2011/0007652 A1 | 1/2011 | Bai | |
| 2011/0032941 A1 | 2/2011 | Quach et al. | |
| 2011/0060831 A1 | 3/2011 | Ishii et al. | |
| 2011/0083174 A1 | 4/2011 | Aldridge et al. | |
| 2011/0093522 A1 | 4/2011 | Chen et al. | |
| 2011/0099623 A1 | 4/2011 | Garrard et al. | |
| 2011/0149879 A1 | 6/2011 | Noriega et al. | |
| 2011/0276982 A1 | 11/2011 | Nakayama et al. | |
| 2011/0302256 A1 | 12/2011 | Sureshehandra et al. | |
| 2012/0008495 A1 | 1/2012 | Shen et al. | |
| 2012/0117382 A1 | 5/2012 | Larson et al. | |
| 2012/0173759 A1 | 7/2012 | Agarwal et al. | |
| 2012/0215910 A1 | 8/2012 | Wada | |
| 2012/0290727 A1 | 11/2012 | Tivig | |
| 2013/0135996 A1 | 5/2013 | Torres et al. | |
| 2013/0136139 A1 | 5/2013 | Zheng et al. | |
| 2013/0166762 A1 | 6/2013 | Jalan et al. | |
| 2013/0176854 A1 | 7/2013 | Chisu et al. | |
| 2013/0191486 A1 | 7/2013 | Someya et al. | |
| 2013/0250765 A1* | 9/2013 | Ehsan | H04L 47/193 370/235 |
| 2013/0258846 A1* | 10/2013 | Damola | H04W 76/022 370/230 |
| 2014/0012972 A1 | 1/2014 | Han | |
| 2014/0169168 A1 | 6/2014 | Jalan et al. | |
| 2014/0207845 A1 | 7/2014 | Han et al. | |
| 2014/0258536 A1 | 9/2014 | Chiong | |
| 2014/0286313 A1* | 9/2014 | Fu | H04W 36/08 370/331 |
| 2014/0359052 A1 | 12/2014 | Joachimpillai et al. | |
| 2015/0026794 A1* | 1/2015 | Zuk | H04L 63/0227 726/13 |
| 2015/0156223 A1 | 6/2015 | Xu et al. | |
| 2015/0237173 A1* | 8/2015 | Virkki | H04L 69/163 709/238 |
| 2015/0244566 A1 | 8/2015 | Puimedon | |
| 2015/0296058 A1 | 10/2015 | Jalan et al. | |
| 2015/0312092 A1 | 10/2015 | Golshan et al. | |
| 2015/0350048 A1 | 12/2015 | Sampat et al. | |
| 2015/0350379 A1 | 12/2015 | Jalan et al. | |
| 2016/0014052 A1 | 1/2016 | Han | |
| 2016/0014126 A1 | 1/2016 | Jalan et al. | |
| 2017/0048107 A1 | 2/2017 | Dosovitsky et al. | |
| 2017/0048356 A1 | 2/2017 | Thompson et al. | |

FOREIGN PATENT DOCUMENTS

| | | |
|---|---|---|
| CN | 1529460 A | 9/2004 |
| CN | 1575582 A | 2/2005 |
| CN | 1910869 A | 2/2007 |
| CN | 101189598 A | 5/2008 |
| CN | 101442425 A | 5/2009 |
| CN | 101682532 A | 3/2010 |
| CN | 102123156 A | 7/2011 |
| CN | 102577252 A | 7/2012 |
| CN | 103533018 A | 1/2014 |
| CN | 103944954 A | 7/2014 |
| CN | 104040990 A | 9/2014 |
| CN | 104137491 A | 11/2014 |
| CN | 104796396 A | 7/2015 |
| CN | 102577252 B | 3/2016 |
| EP | 1209876 A2 | 5/2002 |
| EP | 2296313 A1 | 3/2011 |
| EP | 2760170 A1 | 7/2014 |
| EP | 2760170 B1 | 12/2015 |
| HK | 1189438 A | 6/2014 |
| HK | 1199153 A | 6/2015 |
| HK | 1199779 A | 7/2015 |
| HK | 1200617 A | 8/2015 |
| IN | 261CHE2014 A | 7/2016 |
| JP | 2000307634 A | 11/2000 |
| JP | 2014143686 A | 8/2014 |
| JP | 5906263 B2 | 4/2016 |
| KR | 1020130096624 A | 8/2013 |
| KR | 101576585 B1 | 12/2015 |
| TW | 269763 B | 2/1996 |
| TW | 425821 B | 3/2001 |
| TW | 444478 B | 7/2001 |
| WO | WO2001013228 A2 | 2/2001 |
| WO | WO2001014990 A1 | 3/2001 |
| WO | WO2003103237 A1 | 12/2003 |
| WO | WO2008053954 A1 | 5/2008 |
| WO | WO2011049770 A2 | 4/2011 |
| WO | WO2011079381 A1 | 7/2011 |
| WO | WO2013081952 A1 | 6/2013 |
| WO | WO2013096019 A1 | 6/2013 |
| WO | WO2014031046 A1 | 2/2014 |
| WO | WO2014093829 A1 | 6/2014 |
| WO | WO2015164026 A1 | 10/2015 |

OTHER PUBLICATIONS

Goldszmidt et al., "NetDispatcher: A TCP Connection Router," IBM Research Report RC 20853, May 19, 1997, pp. 1-31.

Koike et al., "Transport Middleware for Network-Based Control," IEICE Technical Report, Jun. 22, 2000, vol. 100, No. 53, pp. 13-18.

Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.

Abe et al., "Adaptive Split Connection Schemes in Advanced Relay Nodes," IEICE Technical Report, Feb. 22, 2010, vol. 109, No. 438, pp. 25-30.

Gite, Vivek, "Linux Tune Network Stack (Buffers Size) to Increase Networking Performance," nixCraft [online], Jul. 8, 2009 [retreived on Apr. 13, 2016], Retreived from the Internt: <URL:http://www.cyberciti.biz/faq/linux-tcp-tuning/>, 24 pages.

"Tcp—TCP Protocol," FreeBSD, Linux Programmer's Manual [online], Nov. 25, 2007 [retrieved on Apr. 13, 2016], Retreived from the Internet: <URL:https://www.freebsd.org/cgi/man.cgi?query=tcp&apropos=0&sektion=7&manpath=SuSE+Linux%2Fi386+11.0&format=asci>, 11 pages.

"Enhanced Interior Gateway Routing Protocol", Cisco, Document ID 16406, Sep. 9, 2005 update, 43 pages.

Crotti, Manuel et al., "Detecting HTTP Tunnels with Statistical Mechanisms", IEEE International Conference on Communications, Jun. 24-28, 2007, pp. 6162-6168.

Haruyama, Takahiro et al., "Dial-to-Connect VPN System for Remote DLNA Communication", IEEE Consumer Communications and Networking Conference, CCNC 2008. 5th IEEE, Jan. 10-12, 2008, pp. 1224-1225.

Chen, Jianhua et al., "SSL/TLS-based Secure Tunnel Gateway System Design and Implementation", IEEE International Workshop on Anti-counterfeiting, Security, Identification, Apr. 16-18, 2007, pp. 258-261.

"EIGRP MPLS VPN PE-CE Site of Origin (SoO)", Cisco Systems, Feb. 28, 2006, 14 pages.

\* cited by examiner

REDUCING BUFFER USAGE FOR TCP PROXY SESSION BASED ON DELAYED ACKNOWLEDGEMENT

CROSS-REFERENCE TO RELATED APPLICATIONS

This application is a continuation of U.S. patent application Ser. No. 13/747,545, filed Jan. 23, 2013 and entitled "Reducing Buffer Usage for TCP Proxy Session Based on Delayed Acknowledgement," issued Dec. 27, 2016 as U.S. Pat. No. 9,531,846. The disclosure of the above reference application is hereby incorporated by reference herein.

FIELD

The present invention relates generally to data communications, and more specifically, to a service gateway.

BACKGROUND

Many service gateways such as firewalls and server load balancers provide Transmission Control Protocol (TCP) proxy functionality for some time. Typical service applications of TCP proxy include network analysis, security, and traffic adaptation due to asymmetric client and server condition. A TCP proxy server typically allocates an amount of memory buffer to handle the data packet buffering of a TCP proxy session between a client device and a server. The memory buffer is used to handle data packet buffers for client side session and server side session. The allocation of memory space among the client side session send and receive buffers, and server side session send and receive buffers does not often take performance into consideration. A TCP proxy server receives a data packet from the server side session, processes the data packet according to the necessary service applications, and transmits the resulting data packet to the client side session. In an ideal scenario, these steps are completed before the next data packet from the server side session is delivered to the TCP proxy server. However, in many deployed situations, client devices access services through mobile broadband access or residual Internet access where such access has a longer transmission time due to long distance wide area network and a slower transmission bandwidth based on subscriber access services. Nevertheless, the TCP proxy server and the servers reside in a same data center, and enjoy short transmission time and high capacity bandwidth. In such deployment scenarios, when the TCP proxy server receives a data packet from the server side session, the received data packet is placed in the server side session receive buffer, and waits for its turn to be processed by the service applications, which in turn waits for the client side session to free up client side session sending buffer, which is filled with pending data packets processed earlier, which in turn are waiting for their turn of transmission due to slow transmission of previously transmitted data packets.

In a typical situation, the TCP proxy server sends a TCP acknowledgement, according to the TCP protocol, upon successfully receiving appropriate amount of TCP data from the server. When the server receives the TCP acknowledgement of prior transmitted TCP data, the server would send additional TCP data packets to the TCP proxy server. The TCP proxy server would further increase memory space for the server side session receive buffer in order to store the additional TCP data packets, while waiting for the prior TCP data to be processed and sent to the client. The cascading effect causes the TCP proxy server to consume large amount of memory space for the server side session receive buffer necessary to hold the received TCP data packets of the server side session. The more buffer space is used, the less the memory resource becomes available for the TCP proxy server to handle additional TCP proxy sessions; despite the TCP proxy server may have other abundant resources to handle additional load.

BRIEF SUMMARY OF THE INVENTION

According to one embodiment of the present invention, a method for reducing buffer usage for a Transmission Control Protocol (TCP) proxy session between a client and a server, comprising: determining a first round trip time (RTT) for a server side TCP session of the TCP proxy session between a service gateway and the server, and determining a second RTT for a client side TCP session of the TCP proxy session between the service gateway and the client; comparing the first RTT with the second RTT by the service gateway; determining whether the second RTT exceeds the first RTT; in response to determining that the second RTT exceeds the first RTT, calculating by the service gateway a desired RTT based on the second RTT; and setting a timer by the service gateway according to the calculated desired RTT, wherein a TCP acknowledgement for the server side TCP session is delayed until the timer expires.

In one aspect of the present invention, the determining whether the second RTT exceeds the first RTT and the calculating a desired RTT based on the second RTT comprise: determining whether the second RTT exceeds the first RTT beyond a predetermined threshold; and in response to determining that the second RTT exceeds the first RTT beyond the predetermined threshold, calculating by the service gateway the desired RTT based on the second RTT.

In one aspect of the present invention, the calculating a desired RTT based on the second RTT comprises: calculating by the service gateway the desired RTT as a percentage of the second RTT.

In one aspect of the present invention, the calculating a desired RTT based on the second RTT comprises: calculating by the service gateway the desired RTT as the second RTT minus a predetermined value.

In one aspect of the present invention, the setting a times by the service gateway according to the calculated desired RTT comprises: receiving by the service gateway a data packet from the server over the server side TCP session; determining by the service gateway a need to send the TCP acknowledgement to the server; setting a timer to the desired RTT by the service gateway; and in response to an expiration of the timer, sending the TCP acknowledgement to the server by the service gateway.

System and computer readable medium corresponding to the above-summarized methods are also described and claimed herein.

DETAILED DESCRIPTION OF THE INVENTION

Figure 1:
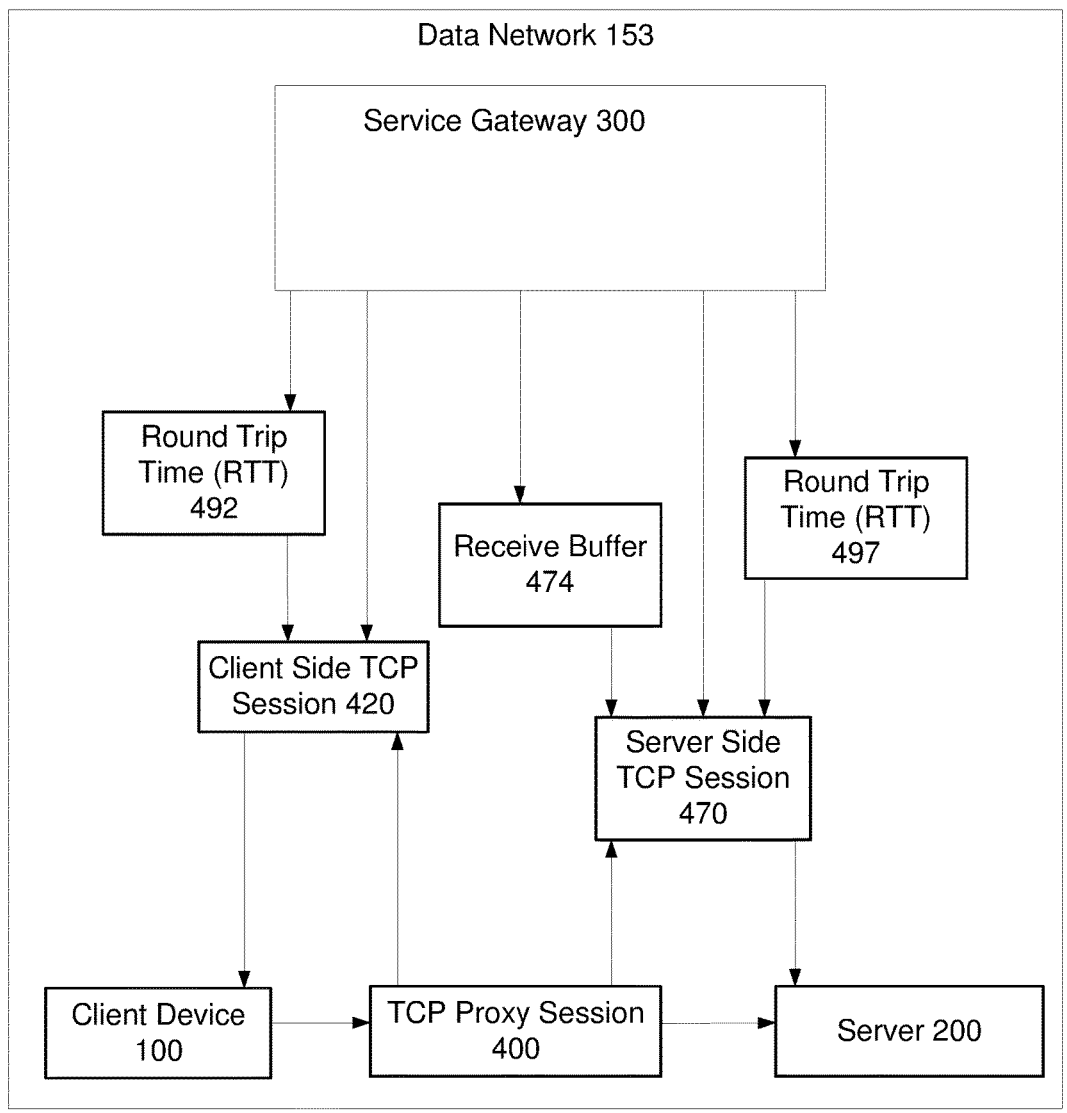
FIG. 1 illustrates a service gateway servicing a TCP proxy session between a client device and a server according to an embodiment of the present invention.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments of the present invention, as described below, adjusts the server side session transmission time, in order to reduce the buffer usage, which in turn increases the capacity of TCP proxy sessions of a TCP proxy server. According to embodiments of the present invention, a TCP proxy server delays a server from sending the additional TCP data, where the delay allows the TCP proxy server to process and send the current TCP data in the server side session receive buffer to be processed and sent to the client. When the server sends the additional TCP data after a delay, the TCP proxy server would have sufficient space in the server side session receive buffer to receive the additional TCP data. Such a delay lengthens the transmission time for the server side session between the server and the TCP proxy server.

FIG. 1 illustrates a service gateway 300 servicing a TCP proxy session 400 between a client device 100 and server device 200 via a data network 153 according to an embodiment of the present invention.

In one embodiment, data network 153 includes an Internet Protocol (IP) network, a corporate data network, a regional corporate data network, an Internet service provider network, a residential data network, a wired network such as Ethernet, a wireless network such as a WiFi network, or a cellular network. In one embodiment, data network 153 resides in a data center, or connects to a network or application network cloud.

Client device 100 is typically a computing device with network access capabilities. In one embodiment, client device 100 is a workstation, a desktop personal computer or a laptop personal computer, a Personal Data Assistant (PDA), a tablet computing device, a smartphone, or a cellular phone, a set-top box, an Internet media viewer, an Internet media player, a smart sensor, a smart medical device, a net-top box, a networked television set, a networked DVR, a networked Blu-ray player, a networked handheld gaming device, or a media center.

In one embodiment, client device 100 is a residential broadband gateway, a business Internet gateway, a business Web proxy server, a network customer premise device (CPE), or an Internet access gateway.

In one embodiment, client device 100 includes a broadband remote access server (BRAS), a Digital Subscriber Line Access Multiplexer (DSLAM), a Cable Modem Terminating System (CMTS), or a service provider access gateway.

In one embodiment, client device 100 includes a mobile broadband access gateway such as a Gateway GPRS Support Node (GGSN), a Home Agent (HA), or a PDN Gateway (PGW).

In one embodiment, client device 100 includes a server load balancer, an application delivery controller, a traffic manager, a firewall, a VPN server, a remote access server, or an enterprise or data center access gateway.

In one embodiment, client device 100 is a device similar to service gateway 300.

Client device 100 initiates TCP proxy session 400 towards server 200 via service gateway 300.

Server 200 is a computing device typically coupled to a processor and a computer readable medium which stores computer readable program code. Server 200, with the processor and the computer readable program code, implements functionality of a Web server, a file server, a video server, a database server, an application server, a voice system, a conferencing server, a media gateway, a media center, an application server or a network server providing a TCP-based service or an application service to client device 100 using the TCP proxy session 400.

In one embodiment, server 200 is a device similar to service gateway 300.

In one embodiment, TCP proxy session 400 includes a HTTP session, a FTP file transfer session, a TCP-based video streaming session, a TCP-based music streaming session, a file download session, a group conferencing session, a database access session, a remote terminal access session, a Telnet session, an e-commerce transaction, a remote procedure call, or a TCP-based network communication session.

Figure 1A:
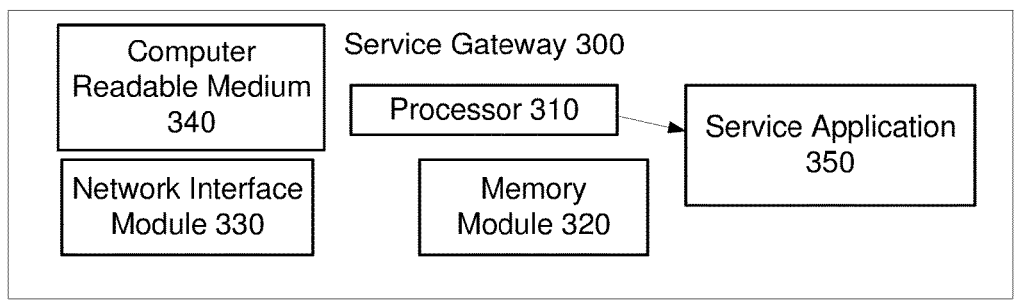
FIG. 1A illustrates components of a service gateway according to an embodiment of the present invention.

Service gateway 300, illustrated in FIG. 1A, is operationally coupled to a processor 310, a memory module 320, a network interface module 330, and a computer readable medium 340. The computer readable medium 340 stores computer readable program code, which when executed by the processor 310 using the memory module 320, implements the various embodiments of the present invention as described herein. In some embodiments, service gateway 300 is implemented as a server load balancer, an application delivery controller, a service delivery platform, a traffic manager, a security gateway, a component of a firewall system, a component of a virtual private network (VPN), a load balancer for video servers, a gateway to distribute load to one or more servers, a Web or HTTP server, a network address translation (NAT) gateway, or a TCP proxy server.

In one embodiment, computer readable medium 340 includes instructions for a service application 350 and processor 310 executes service application 350.

In one embodiment, service application 350 implements functionality of a VPN firewall, a gateway security application, a HTTP proxy, a TCP-based audio or video streaming session proxy, a Web session proxy, content filtering, server load balancing, firewall, or a network application session proxy.

Returning to FIG. 1, in one embodiment of servicing TCP proxy session 400 between client device 100 and server 200, service gateway 300 establishes a client side TCP session 420 with client device 100, and a server side TCP session 470 with server 200.

In one embodiment, service gateway 300 allocates a receive buffer 474 for server side TCP session 470. In one embodiment, receive buffer 474 resides in memory module 320.

In one embodiment, service gateway 300 monitors performance of server side TCP session 470 using round trip time (RTT) 497 of server side TCP session 470. Service gateway 300 measures or estimates RTT 497 for server side TCP session 470. In one example embodiment, service gateway 300 measures RTT 497 based on a time duration between a time service gateway 300 sends a data packet of server side TCP session 470 to server 200 and a time service gateway 300 receives an acknowledgement for the sent data packet. In one embodiment, service gateway 300 measures RTT 497 periodically or occasionally during server side TCP session 470. In one embodiment, service gateway 300 estimates RTT 497 based on one or more prior server side TCP sessions with server 200. In one embodiment, service gateway 300 estimates RTT 497 to be 10 milliseconds, 100 milliseconds, 3 milliseconds, 22 milliseconds, or 3 seconds.

In one embodiment, service gateway 300 retrieves data from receive buffer 474, processes the data by, in one embodiment, service application 350, and transmits the processed data to client device 100 through client side TCP session 420. In one embodiment, service gateway 300 processes data from receive buffer 474 whenever client side TCP session 420 is ready for transmission. A slow transmission of client side TCP session 420 causes delay for service gateway 300 to process data from receive buffer 474. In one embodiment, service gateway 300 monitors performance of client side TCP session 420 using round trip time (RTT) 492 of client side TCP session 420. Service gateway 300 measures or estimates RTT 492 for client side TCP session 420. In one example embodiment, service gateway 300 measures RTT 492 based on a time duration between a time service gateway 300 sends a data packet of client side TCP session 420 to client device 100 and a time service gateway 300 receives an acknowledgement for the sent data packet. In one embodiment, service gateway 300 measures RTT 492 periodically or occasionally during client side TCP session 420. In one embodiment, service gateway 300 estimates RTT 492 based on one or more prior client side TCP sessions with client device 100. In one embodiment, service gateway 300 estimates RTT 492 to be 10 milliseconds, 100 milliseconds, 3 milliseconds, 22 milliseconds, or 3 seconds.

In one embodiment, service gateway 300 compares RTT 497 with RTT 492. In one embodiment, when service gateway 300 determines RTT 492 exceeds RTT 497 beyond a certain threshold, service gateway 300 applies a processing, described further below, in order to adjust RTT 497 to narrow the gap between RTT 492 and RTT 497. In one embodiment, RTT 492 is determined to exceed RTT 497 beyond the threshold when RTT 492 is at least 2 times higher than RTT 497, 5 times higher, or 10 times higher; or when RTT 492 is at least larger than RTT 497 by a predetermined amount such as 20 milliseconds, 50 milliseconds, or 200 milliseconds.

In one embodiment, service gateway 300 determines RTT 492 does not exceed RTT 497 beyond the threshold, and service gateway 300 does not adjust RTT 497.

In one embodiment, service gateway 300 measures RTT 492 and RTT 497 regularly or occasionally, and compares RTT 492 with RTT 497.

Figure 2:
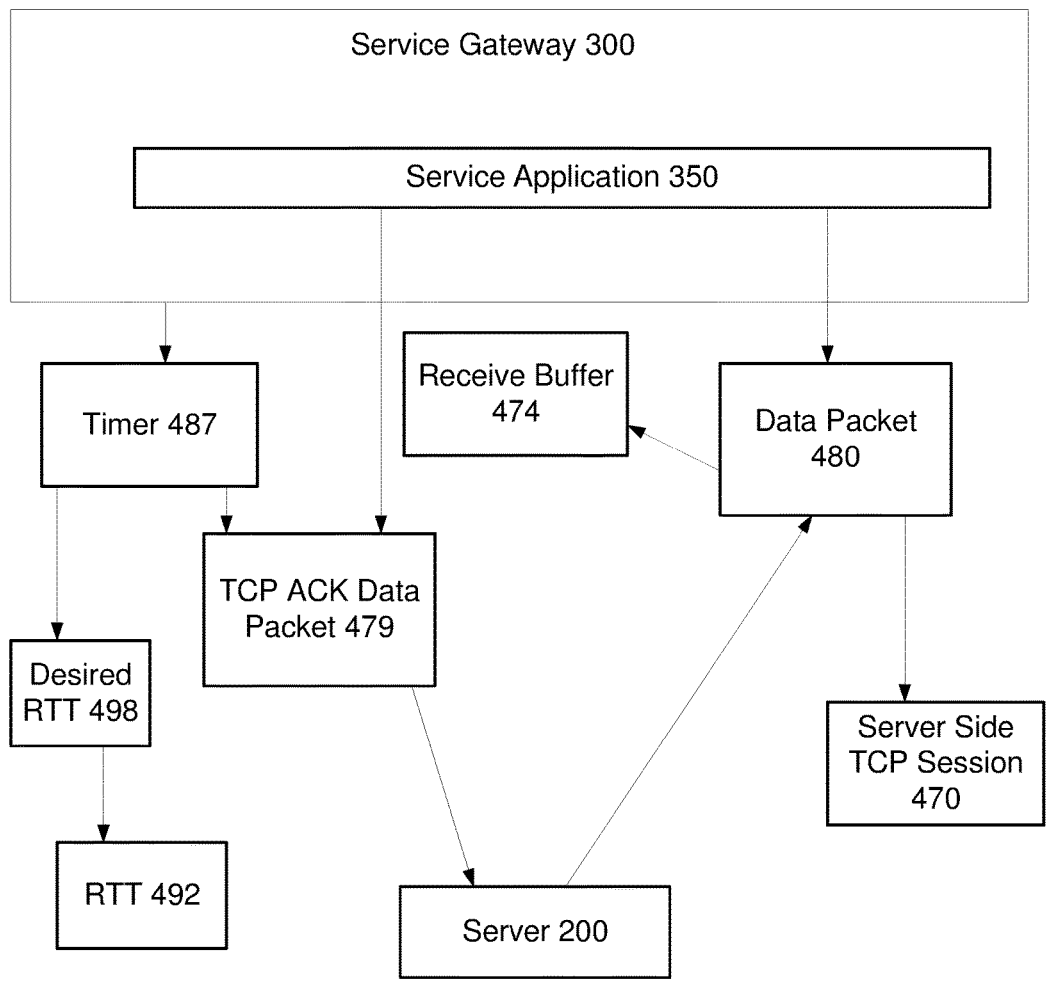
FIG. 2 illustrates a process to delay sending a TCP ACK packet according to an embodiment of the present invention.

FIG. 2 illustrates a process for adjusting RTT 497 for server side TCP session 470 according to an embodiment of the present invention. In one embodiment, service gateway 300 receives data packet 480 over server side TCP session 470 from server 200. Service gateway 300 stores data packet 480 into receive buffer 474. In one embodiment, service gateway 300 determines from receive buffer 474 a need to send a TCP acknowledge (i.e., TCP ACK data packet 479) per TCP protocol. Instead of sending TCP ACK data packet 479 immediately, service gateway 300 schedules to send TCP ACK data packet 479 at a later time, using timer 487. Service gateway 300 sets timer 487 to a desired RTT 498. When timer 487 expires, service gateway 300 sends TCP ACK data packet 479. In one embodiment, service gateway 300 includes a clock (not shown) which allows service gateway 300 to determine if timer 487 expires.

In one embodiment, service gateway 300 calculates desired RTT 498 based on RTT 492. In one embodiment, desired RTT 498 is computed to within a substantial range of RTT 492. For example, desired RTT 498 is computed as a predetermined percentage of RTT 492, such as 30%, 40%, 60% or 75% of RTT 492. In one embodiment, desired RTT 498 is computed to RTT 492 minus a predetermined value, such as 10 millisecond, 5 milliseconds, or 25 milliseconds. Desired RTT 498 provides a timed delay of sending TCP Acknowledgement for server side TCP session 470 and thus increases round trip time of server side TCP session 470. When service gateway 300 measures RTT 497 as illustrated in FIG. 1 after sending TCP ACK data packet 479, RTT 497 is expected have a value similar to desired RTT 498.

In one embodiment, service gateway 300 performs the process of measuring RTT 497, RTT 492, comparing RTT 492 to RTT 497, and processing steps in FIG. 2 when service gateway 300 determines RTT 492 is substantially larger than RTT 497, in order to reduce the memory capacity of receive buffer 474, which in turn increases the capability for service gateway 300 to process additional TCP proxy sessions.

In one embodiment, the predetermined percentage or predetermined value of RTT 492 is determined by a user through experiments using various percentages and values for different TCP proxy sessions for different clients and servers. Typically, the smaller the difference between RTT 492 and RTT 497, the smaller the memory capacity of receive buffer 474 is necessary. In one embodiment, the user configures a desired RTT 498 so as to reduce the difference between RTT 497 and RTT 492. In one embodiment, the predetermined percentage is between 30% and 50%, and is configured by a user to the service gateway 300. The user may configure a higher value for the predetermined percentage or desired RTT 498 for smaller receive buffer 474 capacity, and configure a smaller value for the predetermined percentage or desired RTT 498 for larger receive buffer 474 capacity. The user may consider a predetermined percentage or predetermined value in order to balance between the receive buffer 474 capacity and the desired RTT 498.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for reducing memory usage of a service gateway buffer resident in a memory module of a service gateway for a Transmission Control Protocol (TCP) proxy session between a client and a server by adjusting server side session transmission time to reduce buffer usage, comprising:
   determining a first round trip time (RTT) for a server side TCP session of the TCP proxy session between the service gateway and the server, the first RTT being estimated based at least on an average of one or more prior server side TCP sessions with the server;
   determining a second RTT for the client side TCP session of the TCP proxy session between the service gateway and the client, the second RTT being estimated based at least on an average of one or more prior client side TCP sessions with the client;
   comparing the first RTT with the second RTT by the service gateway;
   determining that the second RTT exceeds the first RTT;
   comparing a difference between the second RTT and the first RTT;
   in response to determining that the difference is above a predetermined threshold, calculating by the service gateway a desired RTT based on the second RTT, the calculation based at least in part on a memory capacity of server side receive buffer; and
   setting a timer by the service gateway according to the calculated desired RTT, wherein a TCP acknowledgement for the server side TCP session is delayed until the service gateway determines that the timer expires.

2. The method of claim 1, wherein the determining whether the second RTT exceeds the first RTT and the calculating a desired RTT based on the second RTT comprise:
   determining whether the second RTT exceeds the first RTT beyond a predetermined threshold; and
   in response to determining that the second RTT exceeds the first RTT beyond the predetermined threshold, calculating by the service gateway the desired RTT based on the second RTT.

3. The method of claim 1, wherein the calculating a desired RTT based on the second RTT comprises:
   calculating by the service gateway the desired RTT as a percentage of the second RTT.

4. The method of claim 1, wherein the calculating a desired RTT based on the second RTT comprises: calculating by the service gateway the desired RTT as the second RTT minus a predetermined value.

5. The method of claim 1, wherein the setting a timer by the service gateway according to the calculated desired RTT comprises:
   receiving by the service gateway a data packet from the server over the server side TCP session;
   determining by the service gateway a need to send the TCP acknowledgement to the server;
   setting a timer to the desired RTT by the service gateway; and
   in response to an expiration of the timer, sending the TCP acknowledgement to the server by the service gateway.

6. The method of claim 1, wherein the second RTT is determined at periodic intervals.

7. The method of claim 1, wherein the second RTT is estimated based on one or more prior server side TCP sessions.

8. A non-transitory computer readable medium with computer readable program code embodied therewith for reducing memory usage of a service gateway buffer resident in a memory module of a service gateway for a Transmission Control Protocol (TCP) proxy session between a client and a server by adjusting server side session transmission time to reduce buffer usage, the computer readable program code configured to:
   determine a first round trip time (RTT) for a server side TCP session of the TCP proxy session between a service gateway and the server, the first RTT being estimated based at least on an average of one or more prior server side TCP sessions with the server;
   determine a second RTT for the client side TCP session of the TCP proxy session between the service gateway and the client, the second RTT being estimated based at least on an average of one or more prior client side TCP sessions with the client;
   compare the first RTT with the second RTT by the service gateway;
   determine that the second RTT exceeds the first RTT;

compare a difference between the second RTT and the first RTT;
in response to determining that the difference is above a predetermined threshold, calculate a desired RTT based on the second RTT, the calculation based at least in part on a memory capacity of server side receive buffer; and
set a timer by the service gateway according to the calculated desired RTT, wherein the TCP acknowledgement for the server side TCP session is delayed until the service gateway determines that the timer expires.

9. The non-transitory computer readable medium of claim 8, wherein the computer readable program code configured to determine whether the second RTT exceeds the first RTT and to calculate a desired RTT based on the second RTT are further configured to:
determine whether the second RTT exceeds the first RTT beyond a predetermined threshold; and
in response to determining that the second RTT exceeds the first RTT beyond the predetermined threshold, calculating by the service gateway the desired RTT based on the second RTT.

10. The non-transitory computer readable medium of claim 8, wherein the computer readable program code configured to calculate a desired RTT based on the second RTT is further configured to:
calculate the desired RTT as a percentage of the second RTT.

11. The non-transitory computer readable medium of claim 8, wherein the computer readable program code configured to calculate a desired RTT based on the second RTT is further configured to:
calculate the desired RTT as the second RTT minus a predetermined value.

12. The non-transitory computer readable medium of claim 8, where computer readable program code configured to set the timer according to the calculated desired RTT is further configured to:
receive a data packet from the server over the server side TCP session;
determine a need to send the TCP acknowledgement to the server; set a timer to the desired RTT; and
in response to an expiration of the timer, send the TCP acknowledgement to the server.

13. A system for reducing memory usage of a service gateway buffer for a Transmission Control Protocol (TCP) proxy session between a client and a server by adjusting server side session transmission time to reduce the buffer usage, the system comprising:
a service gateway comprising a processor, a memory module, and a server side receive buffer residing in the memory module, wherein a server side TCP session of the TCP proxy session is established between the service gateway and the server, and a client side TCP session of the TCP proxy session is established between the service gateway and the client, wherein the service gateway:
determines a first round trip time (RTT) for a server side TCP session of the TCP proxy session between the service gateway and the server the first RTT being estimated based on at least an average of one or more prior server side TCP sessions with the server;
determines a second RTT for the client side TCP session of the TCP proxy session between the service gateway and the client, the second RTT being estimated based at least on an average of one or more prior client side TCP sessions with the client;
compares the first RTT with the second RTT;
determines that the second RTT exceeds the first RTT;
compares a difference between the second RTT and the first RTT;
in response to determining that the difference is above a predetermined threshold, calculates a desired RTT based on the second RTT, the calculation based at least in part on a memory capacity of server side receive buffer; and
sets a timer according to the calculated desired RTT, wherein the TCP acknowledgement for the server side TCP session is delayed until the timer expires.

14. The system of claim 13, wherein the determines whether the second RTT exceeds the first RTT and the calculates a desired RTT based on the second RTT comprise:
determines whether the second RTT exceeds the first RTT beyond a predetermined threshold; and
in response to determining that the second RTT exceeds the first RTT beyond the predetermined threshold, calculates the desired RTT based on the second RTT.

15. The system of claim 13, wherein the calculates a desired RTT based on the second RTT comprises: calculates the desired RTT as a percentage of the second RTT.

16. The system of claim 13, wherein the calculates a desired RTT based on the second RTT comprises: calculates the desired RTT as the second RTT minus a predetermined value.

17. The system of claim 13, wherein the sets a timer according to the calculated desired RTT further comprises:
receives a data packet from the server over the server side TCP session; determines a need to send the TCP acknowledgement to the server; sets a timer to the desired RTT; and
in response to an expiration of the timer, sends the TCP acknowledgement to the server.

* * * * *